Patented July 14, 1953

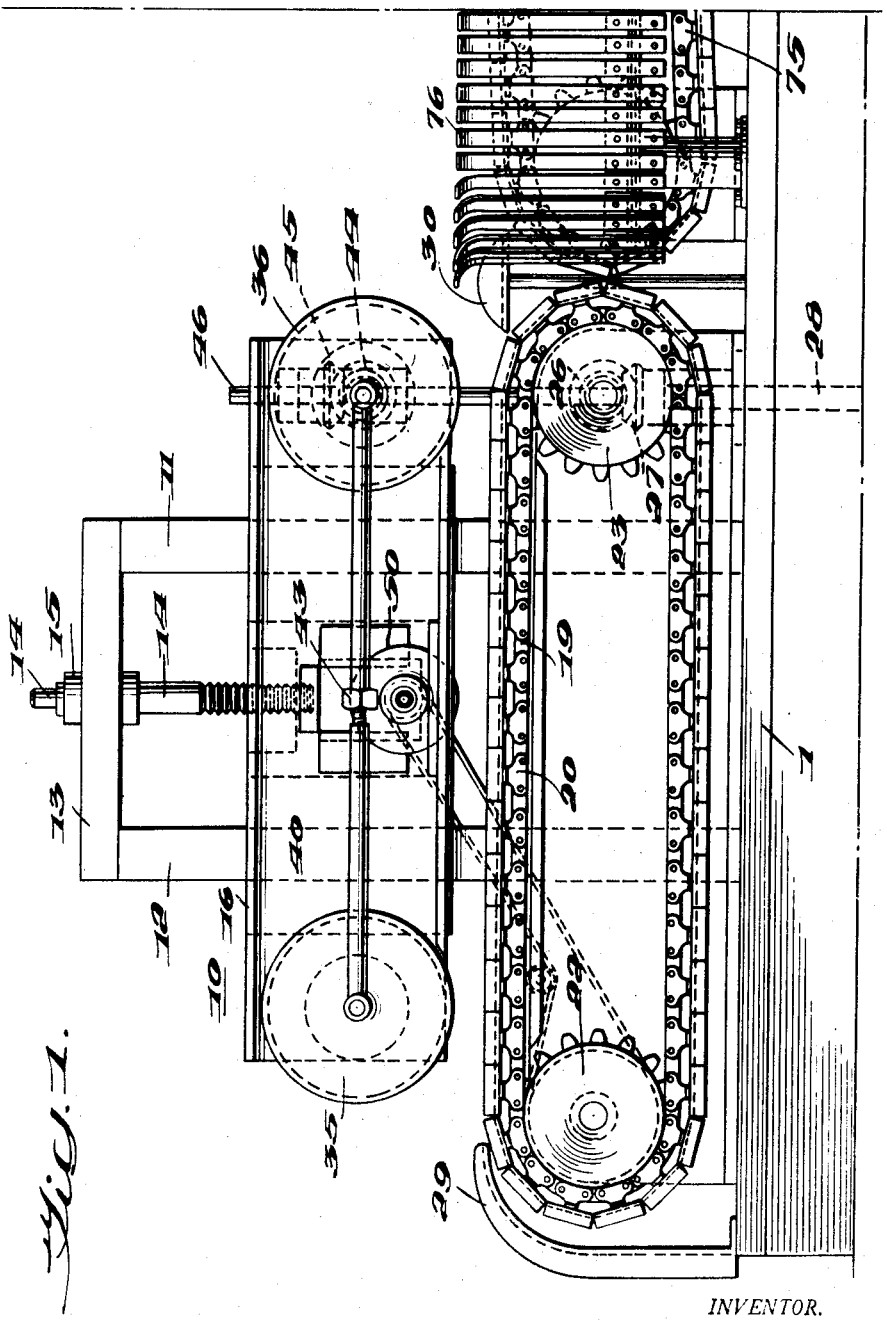

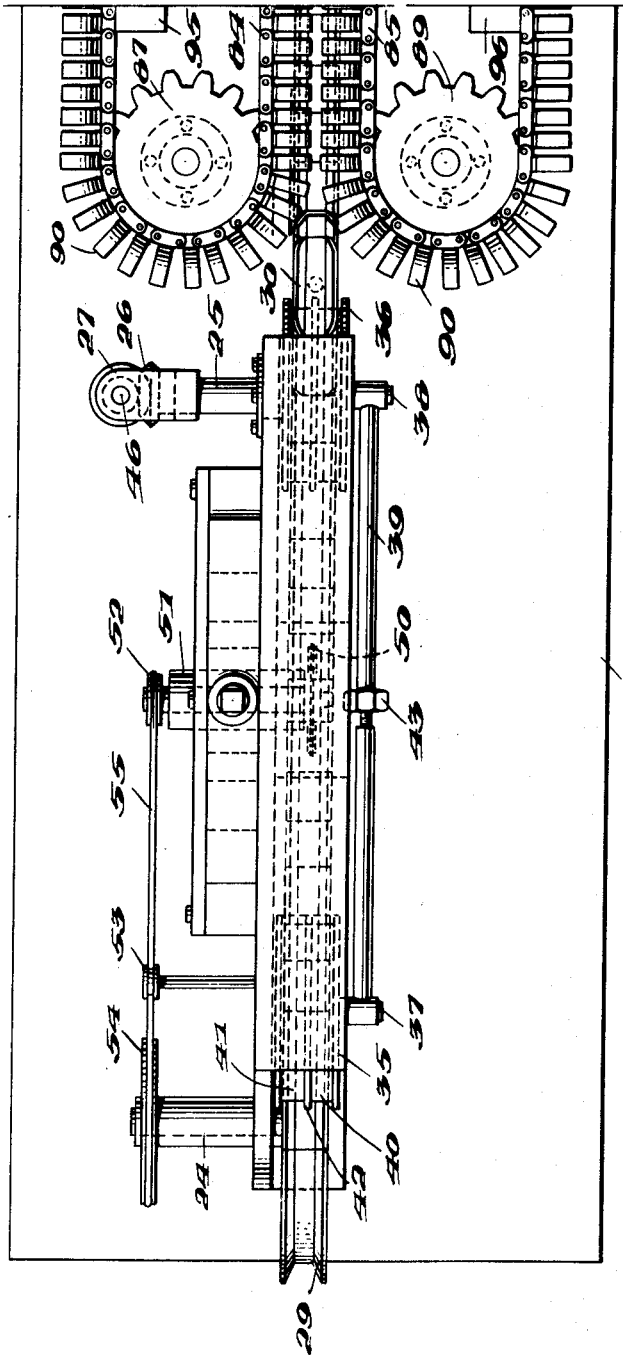

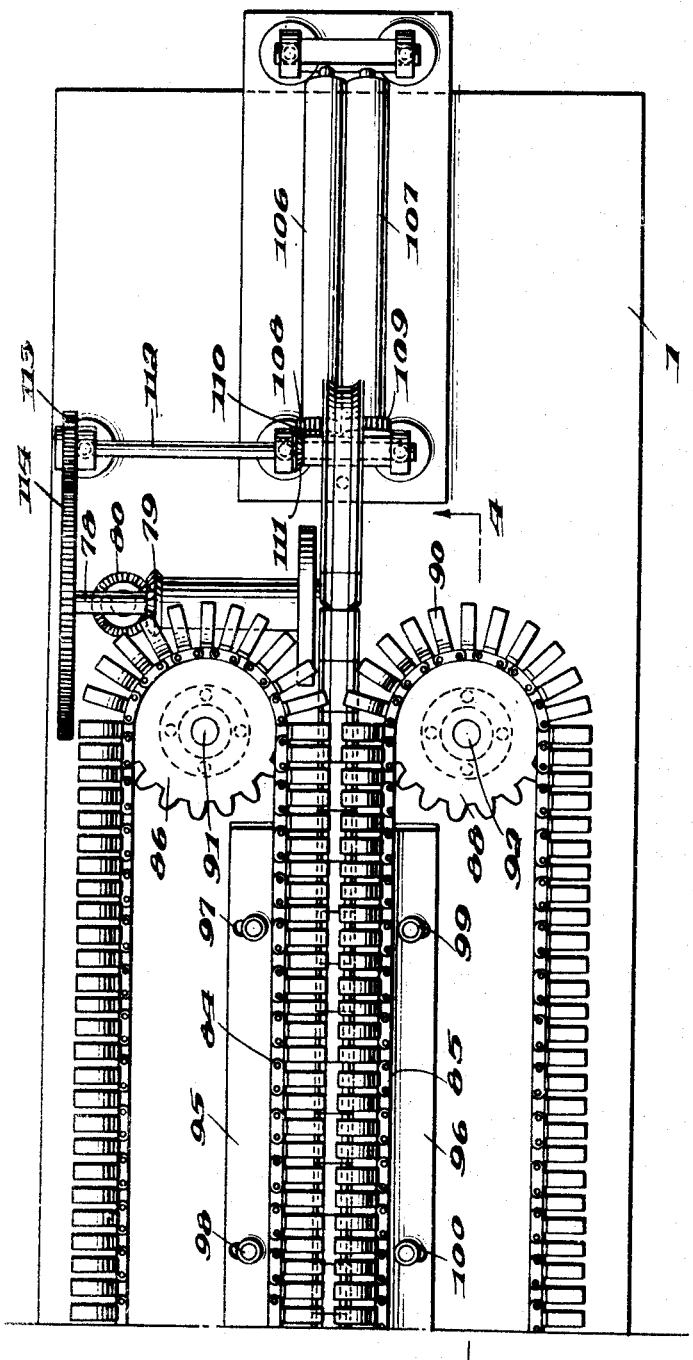

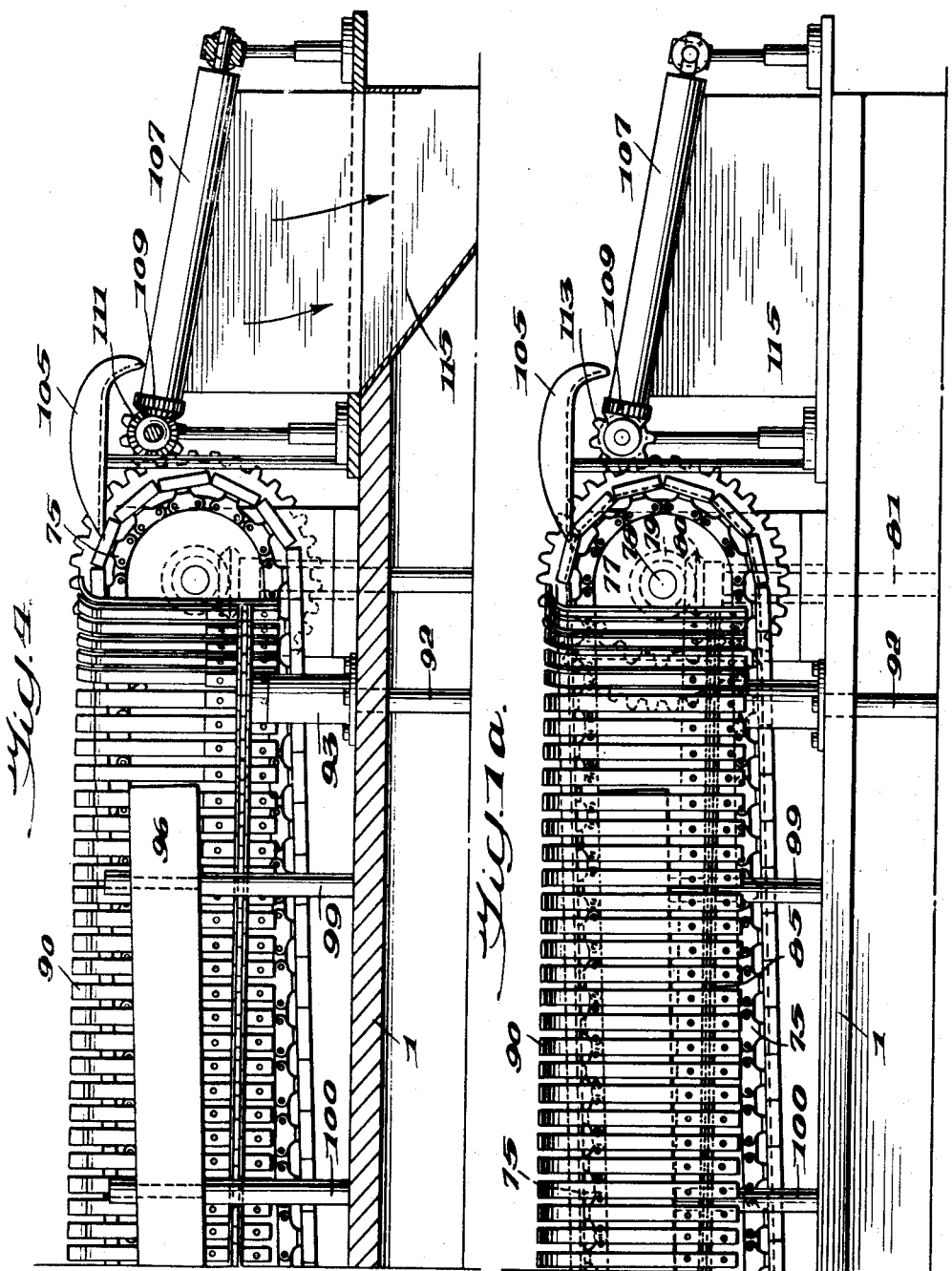

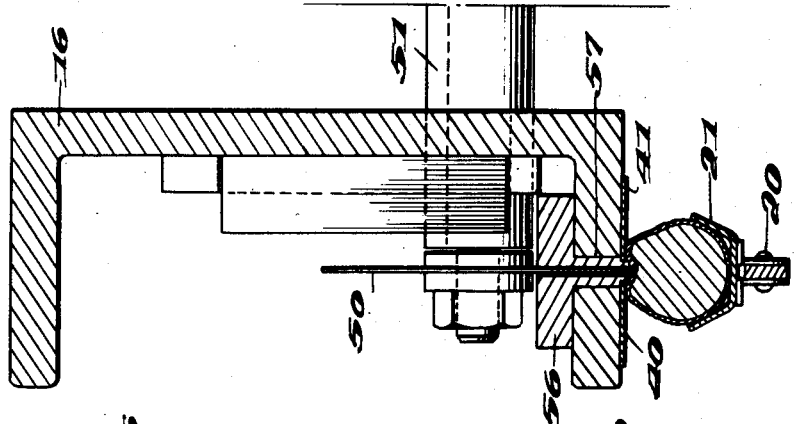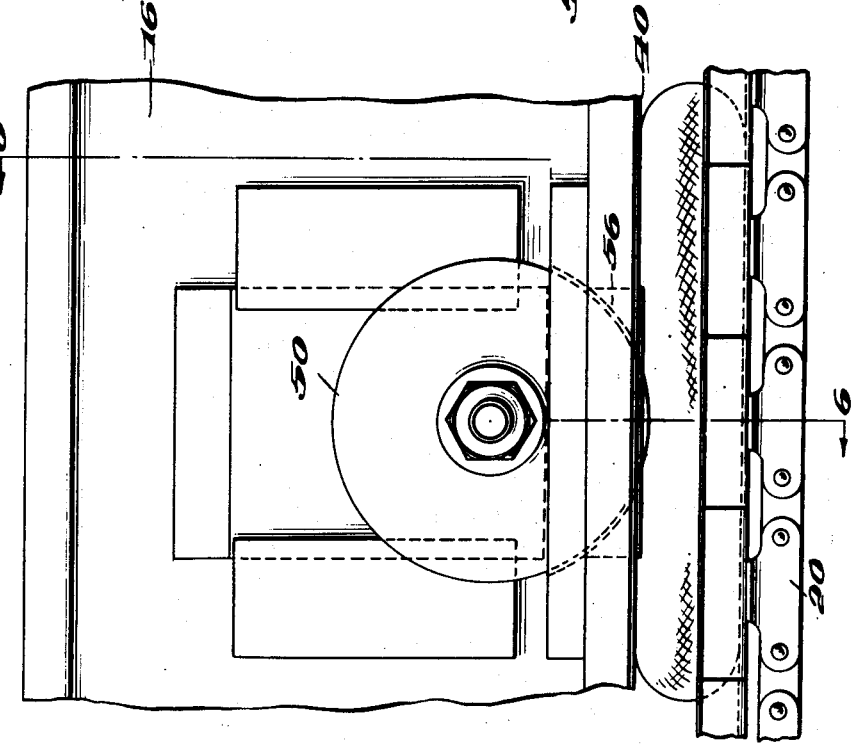

2,644,979

UNITED STATES PATENT OFFICE 2,644,979

APPARATUS FOR STRIPPING AND REMOVING ARTIFICIAL CASINGS FROM SAUSAGES

James William Ball, Dallas, Tex., assignor of forty-five per cent to Willard R. Gunderson and ten per cent to A. P. Broiles, both of Dallas County, Tex.

Application January 17, 1950, Serial No. 139,022

19 Claims. (Cl. 17—1)

The present invention relates to skinless sausage making and more particularly to an apparatus for stripping and removing the artificial casing preliminarily used in the preparation of skinless sausage.

In one known procedure for the manufacture of skinless sausage, the meat is first packed in an artificial and usually inedible casing such as a cellophane type continuous tube. At intervals determined by the desired length of sausage, the tubing is twisted down to form a link between individual sausages. The stuffed casing is then submitted to sausage processing operations such as dyeing, smoking and chilling. As a final step in preparing the sausage for market, the processed sausage must be removed from within the casing by stripping the casing from the prepared sausage.

It is a principal object of this invention to provide an improved apparatus for continuously stripping the artificial casing from prepared sausage in the production of skinless sausage.

One of the important objects of this invention is to provide an improved sausage casing stripping apparatus that will enable the artificial casing to be continuously stripped from prepared sausage of varying length.

Another object of this invention is to provide a sausage casing stripping machine having improved means to strip the casing in a rapid and thorough manner and readily adaptable to various sizes of sausages.

Yet another object of this invention is to provide a sausage casing stripping machine having novel sausage sizing and cutting or slitting mechanism that does not cut or score the sausage meat.

The apparatus performs a casing stripping method which includes the steps of first slitting the casing longitudinally of the sausage, thereafter frictionally engaging or gripping the casing by a cross-sweeping motion with the encased sausage string moving on an inclined axis between gripping members to strip the casing from the sausage, and finally mechanically separating the stripped casing and skinless sausage. The operation of the apparatus may further function to compress the sausage to a predetermined size beneath a cutting element so that precise slitting of the casing is obtained without scoring the sausage meat.

In its preferred embodiment, the sausage casing stripping apparatus of this invention includes a plurality of continuous conveyors for conveying a string of prepared sausage meat and casing, firstly, past a sausage sizing and casing slitting knife, secondly, between a plurality of resilient friction gripping and stripping fingers in a manner to cross-sweep the slit casing from around the sausage meat, and, lastly, to a pair of co-acting rollers so arranged as to finally separate the stripped artificial casing from the prepared skinless sausage. The sizing mechanism and slitting knife may be relatively adjustable to precisely determine the depth of the slit with regard to a known thickness of sausage casing, and the entire mechanism, including both the sizing mechanism and the slitting knife, is adjustable with respect to the sausage conveyor in order that the machine may accommodate sausages of different diameters. The plurality of sausage conveyors are preferably comprised of a plurality of flexible chain links that are provided with especially shaped pan surfaces to support and convey a sausage body. In the stripping portion of the machine, the sausage conveyor is adapted to move the sausage in an inclined path between a pair of opposed endless belts having a plurality of resilient fingers frictionally engaging the sausage casing. By suitably adjusting the relative speeds of the inclined sausage conveyor and the opposed endless belts, the desired amount of cross-sweep action for stripping the sausage casing may be obtained so that efficient operation can be realized with only a single longitudinal slit of the sausage casing. The invention may further provide an adjustment of the friction grip of the stripping fingers. In the final stage of the machine, the stripped casing is crushed and fed between a pair of counter-rotating coacting rollers mounted on an inclined axis so that the skinned sausage now completely separated from the artificial casing can move forward into a collection receptacle or upon a subsequent packaging conveyor.

For a more detailed description of the present invention, reference will be made to the following specification and drawings, in which:

Figures 1 and 1a show a continuous side elevation of the entire machine;

Figures 2 and 2a show a continuous top plan view of the entire machine;

Figure 3 is a detail perspective of the conveyor link used in either of the sausage conveyors;

Figure 4 is a partial section on the lines 4—4 of Figure 2a;

Figure 5 is a fragmentary detail of the casing slitting mechanism generally shown in Figure 1;

Figure 6 is a cross section on the lines 6—6 of Figure 5.

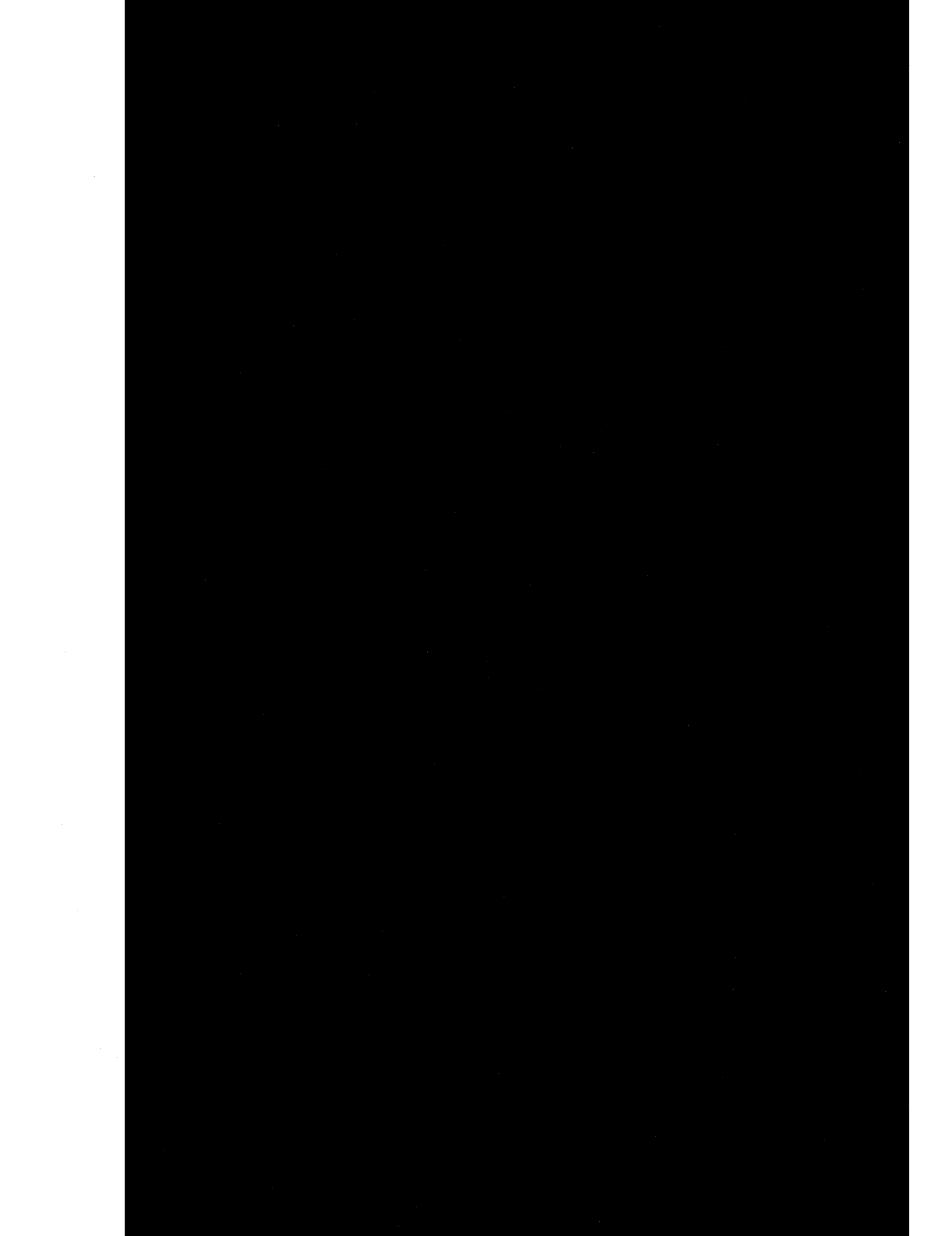

referred to. The stripped sausage casing is crushed and gripped to be fed between the counter-rotating rollers 106 and 107 into the trough 115. It will be noted that the rollers 106 and 107 are journalled on suitable supports in such manner as to be downwardly inclined towards the discharge end of the machine. Thus, the stripped and now skinless sausage are conveyed off the discharge end of the rollers 106 and 107 and separate from the stripped casing which passes into trough 115.

The source of power, which may be an electric motor, has not been shown in order to simplify the drawings. It should be understood that shafts 28, 81, 91 and 92 may be driven from an electric motor through a variable speed transmission in any suitable known manner to obtain the desired shaft rotation and speeds to cause the most effective operation of the machine. It should also be understood that the details of the machine framework and adjusting devices for the sausage sizes and casing slitter have not been shown in order to avoid complicating the drawings unnecessarily since the details of such elements will be obvious to any one skilled in the art.

To operate the machine a string of prepared sausage in a continuous linked casing to be stripped from the sausage is first fed through the machine by hand until the stripped casing may be crushed and fed between rollers 106 and 107. Thereafter, the machine may be operated at speed to automatically and continuously strip the casing, regardless of the varying lengths of the sausage between the casing links. As should now be readily understood, adjustments of the machine for varying sausage diameters or casing thickness, as previously described, may be readily made by raising or lowering the cutting knife 50 and its supporting frame member 16 carried by the adjustable threaded spindle 14.

I claim:

1. Apparatus for stripping the artificial casing from prepared sausage which comprises a main conveyor for the encased sausage, casing slitting means positioned relative to said conveyor to slit the artificial casing as it is conveyed past said slitting means, means operatively associated with said conveyor to move the same toward said slitting means, second conveying means operatively associated with said main conveyor for the slit casing and sausage, casing gripping means operatively associated with said second conveying means for frictionally engaging the slit casing, said second conveying means having an inclined path relative to said gripping means to provide a cross-sweep motion between said slit casing and gripping means to thereby strip said casing from said sausage, means operatively associated with said second conveying means to separate said stripped casing and sausage, and driving means to move said second conveying means and said gripping means toward said means to separate.

2. Apparatus for stripping the artificial casing from prepared sausage which comprises a main conveyor for the encased sausage, a rotatable cutting knife positioned relative to said conveyor to slit the artificial casing as it is conveyed past said cutting knife, means operatively associated with said conveyor to move the same toward said cutting knife, second conveying means operatively associated with said main conveyor for the slit casing and sausage, casing gripping means operatively associated with said second conveying means for frictionally engaging the slit casing, said second conveying means having an inclined path relative to said gripping means to provide a cross-sweep motion between said slit casing and gripping means to thereby strip said casing from said sausage, means operatively associated with said second conveying means to separate said stripped casing and sausage, and driving means to move said second conveying means and said gripping means toward said means to separate.

3. Apparatus for stripping the artificial casing from prepared sausage which comprises a main conveyor for the encased sausage, casing slitting means positioned relative to said conveyor to slit the artificial casing at it is conveyed past said slitting means, means operatively associated with said conveyor to move the same toward said slitting means, second conveying means operatively associated with said main conveyor for the slit casing and sausage, casing gripping means operatively associated with said second conveying means for frictionally engaging opposite sides of the slit casing, said second conveying means having an inclined path relative to said gripping means to provide a cross-sweep motion between said slit casing and gripping means to thereby strip said casing from said sausage, means operatively associated with said second conveying means to separate said stripped casing and sausage, and driving means to move said second conveying means and said gripping means toward said means to separate.

4. Apparatus for stripping the artificial casing from prepared sausage which comprises a main conveyor for the encased sausage, casing slitting means positioned relative to said conveyor to slit the artificial casing as it is conveyed past said slitting means, said slitting means being adjustable relative to said conveyor to accommodate sausage and casing of different sizes, means operatively associated with said conveyor to move the same toward said slitting means, second conveying means operatively associated with said main conveyor for the slit casing and sausage, casing gripping means operatively associated with said second conveying means for frictionally engaging the slit casing, said second conveying means having an inclined path relative to said gripping means to provide a cross-sweep motion between said slit casing and gripping means to thereby strip said casing from said sausage, means operatively associated with said second conveying means to separate said stripped casing and sausage, and driving means to move said second conveying means and said gripping means toward said means to separate.

5. Apparatus for stripping the artificial casing from prepared sausage which comprises a main conveyor for the encased sausage, casing slitting means positioned relative to said conveyor to slit the artificial casing as it is conveyed past said slitting means, means operatively associated with said conveyor to move the same toward said slitting means, second conveying means operatively associated with said main conveyor for the slit casing and sausage, casing gripping means operatively associated with said second conveying means for frictionally engaging the slit casing, said gripping means being adjustable relative to said second conveying means to vary the amount of frictional engagement and accommodate sausage and casing of different sizes, said second conveying means having an inclined path relative to said gripping means to provide a cross-sweep motion between said slit casing and gripping means to thereby strip said casing from said sausage, means operatively associated with said second conveying means to separate said stripped casing and sausage, and driving means to move said second conveying means and said gripping means toward said means to separate.

6. Apparatus for stripping the artificial casing from prepared sausage which comprises a main conveyor for the encased sausage, casing slitting means positioned relative to said conveyor to slit the artificial casing as it is conveyed past said slitting means, said slitting means being adjustable relative to said conveyor to accommodate sausage and casing of different sizes, means operatively associated with said conveyor to move the same toward said slitting means, second conveying means operatively associated with said main conveyor for the slit casing and sausage, casing gripping means operatively associated with said second conveying means for frictionally engaging the slit casing, said gripping means being adjustable relative to said second conveying means to vary the amount of frictional engagement and accommodate sausage and casing of different sizes, said second conveying means having an inclined path relative to said gripping means to provide a cross-sweep motion between said slit casing and gripping means to thereby strip said casing from said sausage, means operatively associated with said second conveying means to separate said stripped casing and sausage, and driving means to move said second conveying means and said gripping means toward said means to separate.

7. Apparatus for stripping the artificial casing from prepared sausage which comprises a main conveyor for the encased sausage, casing slitting means positioned relative to said conveyor to slit the artificial casing as it is conveyed past said slitting means, means operatively associated with said conveyor to move the same toward said slitting means, second conveying means operatively associated with said main conveyor for the slit casing and sausage, casing gripping means operatively associated with said second conveying means for frictionally engaging the slit casing, said second conveying means having an inclined path relative to said gripping means to provide a cross-sweep motion between said slit casing and gripping means to thereby strip said casing from said sausage, means operatively associated with said second conveying means to separate said stripped casing and sausage, and driving means to move said second conveying means and said gripping means toward said means to separate, said main conveyor and second conveying means having a plurality of conveyor links with pan-shaped surfaces for supporting the sausage.

8. Apparatus for stripping the artificial casing from prepared sausage which comprises a main conveyor for the encased sausage, casing slitting means positioned relative to said conveyor to slit the artificial casing as it is conveyed past said slitting means, means operatively associated with said conveyor to compress and size the casing and sausage on the conveyor as it approaches said slitting means, means operatively associated with said conveyor to move the same toward said slitting means, second conveying means operatively associated with said main conveyor for the slit casing and sausage, casing gripping means operatively associated with said second conveying means for frictionally engaging the slit casing, said second conveying means having an inclined path relative to said gripping means to provide a cross-sweep motion between said slit casing and gripping means to thereby strip said casing from said sausage, means operatively associated with said second conveying means to separate said stripped casing and sausage, and driving means to move said second conveying means and said gripping means toward said means to separate.

9. Apparatus for stripping the artificial casing from prepared sausage which comprises a main conveyor for the encased sausage, casing slitting means positioned relative to said conveyor to slit the artificial casing as it is conveyed past said slitting means, means operatively associated with said conveyor to compress and size the casing and sausage on the conveyor as it approaches said slitting means, both said means to compress and said slitting means being adjustable relative to said conveyor to accommodate sausage and casing of different sizes, means operatively associated with said conveyor to move the same toward said slitting means, second conveying means operatively associated with said main conveyor for the slit casing and sausage, casing gripping means operatively associated with said second conveying means for frictionally engaging the slit casing, said second conveying means having an inclined path relative to said gripping means to provide a cross-sweep motion between said slit casing and gripping means to thereby strip said casing from said sausage, means operatively associated with said second conveying means to separate said stripped casing and sausage, and driving means to move said second conveying means and said gripping means toward said means to separate.

10. Apparatus for stripping the artificial casing from prepared sausage which comprises a main conveyor for the encased sausage, casing slitting means positioned relative to said conveyor to slit the artificial casing as it is conveyed past said slitting means, means operatively associated with said conveyor to compress and size the casing and sausage on the conveyor as it approaches said slitting means, both said means to compress and said slitting means being adjustable relative to said conveyor to accommodate sausage and casing of different sizes, means operatively associated with said conveyor to move the same toward said slitting means, second conveying means operatively associated with said main conveyor for the slit casing and sausage, casing gripping means for frictionally engaging the slit casing, said second conveying means operatively associated with said second conveying means having an inclined path relative to said gripping means to provide a cross-sweep motion between said slit casing and gripping means to thereby strip said casing from said sausage, means operatively associated with said second conveying means to separate said stripped casing and sausage, and driving means to move said second conveying means and said gripping means toward said means to separate, said means to compress consisting of an endless band spaced above said main conveyor and movable simultaneously with said main conveyor in the same direction as said main conveyor.

11. Apparatus for stripping the artificial casing from prepared sausage which comprises a main conveyor for the encased sausage, casing slitting means positioned relative to said conveyor to slit the artificial casing as it is conveyed past said slitting means, means operatively associated with said conveyor to move the same toward said slitting means, second conveying means operatively associated with said main conveyor for the slit casing and sausage, casing gripping means operatively associated with said second conveying means for frictionally engaging the slit casing, said second conveying means having an inclined path relative to said gripping means to provide a cross-sweep motion between said slit casing and gripping means to thereby strip said casing from said sausage, means operatively associated with said second conveying means to separate said stripped casing and sausage, and driving means to move said second conveying means and said gripping means comprising an endless loop movable in the direction of said second conveying means and a plurality of spring fingers carried thereby.

12. Apparatus for stripping the artificial casing from prepared sausage which comprises a main conveyor for the encased sausage, casing slitting means positioned relative to said conveyor to slit the artificial casing as it is conveyed past said slitting means, means operatively associated with said conveyor to move the same toward said slitting means, second conveying means operatively associated with said main conveyor for the slit casing and sausage, casing gripping means operatively associated with said second conveying means for frictionally engaging the slit casing, said second conveying means having an inclined path relative to said gripping means to provide a cross-sweep motion between said slit casing and gripping means to thereby strip said casing from said sausage, means operatively associated with said second conveying means to separate said stripped casing and sausage, and driving means to move said second conveying means and said gripping means comprising a pair of endless loops positioned on opposite sides respectively of said second conveying means and movable in the direction of said second conveying means and having a plurality of spring fingers carried thereby.

13. Apparatus for stripping the artificial casing from prepared sausage which comprises a main conveyor for the encased sausage, casing slitting means positioned relative to said conveyor to slit the artificial casing as it is conveyed past said slitting means, means operatively associated with said conveyor to move the same toward said slitting means, second conveying means operatively associated with said main conveyor for the slit casing and sausage, casing gripping means operatively associated with said second conveying means for frictionally engaging the slit casing, said second conveying means having an inclined path relative to said gripping means to provide a cross-sweep motion between said slit casing and gripping means to thereby strip said casing from said sausage, means operatively associated with said second conveying means to separate said stripped casing and sausage, and driving means to move said second conveying means and said gripping means comprising an endless loop movable in the direction of said second conveying means and a plurality of spring fingers carried thereby, said endless loop being movable at an adjustable speed relative to the speed of movement of said second conveying means.

14. Apparatus for stripping the artificial casing from prepared sausage which comprises a main conveyor for the encased sausage, casing slitting means positioned relative to said conveyor to slit the artificial casing as it is conveyed past said slitting means, means operatively associated with said conveyor to compress and size the casing and sausage on the conveyor as it approaches said slitting means, both said means to compress and said slitting means being adjustable relative to said conveyor to accommodate sausage and casing of different sizes, means operatively associated with said conveyor to move the same toward said slitting means, second conveying means operatively associated with said main conveyor for the slit casing and sausage, casing gripping means operatively associated with said second conveying means for frictionally engaging the slit casing, said second conveying means having an inclined path relative to said gripping means to provide a cross-sweep motion between said slit casing and gripping means to thereby strip said casing from said sausage, means operatively associated with said second conveying means to separate said stripped casing and sausage, and driving means to move said second conveying means and said gripping means toward said means to separate, said gripping means comprising an endless loop and a plurality of spring fingers carried thereby movable in the direction of said second conveying means, said endless loop being movable at an adjustable speed relative to the speed of movement of said second conveying means.

15. Apparatus for stripping the artificial casing from prepared sausage which comprises a main conveyor for the encased sausage, casing slitting means positioned relative to said conveyor to slit the artificial casing as it is conveyed past said slitting means, means operatively associated with said conveyor to move the same toward said slitting means, second conveying means operatively associated with said main conveyor for the slit casing and sausage, casing gripping means operatively associated with said second conveying means for frictionally engaging the slit casing, said second conveying means having an inclined path relative to said gripping means to provide a cross-sweep motion between said slit casing and gripping means to thereby strip said casing from said sausage, means operatively associated with said second conveying means to separate said stripped casing and sausage, and driving means to move said second conveying means and said gripping means comprising an endless loop movable in the direction of said conveying means and a plurality of spring fingers carried by said endless loop, said spring fingers having means to adjust their tension against the sausage casing.

16. Apparatus for stripping the artificial casing from prepared sausage which comprises a means conveyor for the encased sausage, casing slitting means positioned relative to said conveyor to slit the artificial casing as it is conveyed past said slitting means, means operatively associated with said main conveyor to move the same toward said slitting means, second conveying means operatively associated with said main conveyor for the slit casing and sausage, casing gripping means operatively associated with said second conveying means for frictionally engaging the slit casing, said second conveying means having an inclined path relative to said gripping means to provide a cross-sweep motion between said slit casing and gripping means to thereby strip said casing from said sausage, means operatively associated with said second conveying means to separate said stripped casing and sausage, and driving means to move said second conveying means and said gripping means comprising a pair of endless loops positioned on opposite sides respectively of said second conveying means and movable in the direction of said second conveying means and a plurality of spring fingers carried by opposite runs of said loops, said spring fingers having means to adjust their tension against opposite sides of the sausage casing.

17. Apparatus for stripping the artificial casing from prepared sausage which comprises a main conveyor for the encased sausage, casing slitting means positioned relative to said conveyor to slit the artificial casing as it is conveyed past said slitting means, means operatively associated with said conveyor to move the same toward said slitting means, second conveying means operatively associated with said main conveyor for the slit casing and sausage, casing gripping means operatively associated with said second conveying means for frictionally engaging the slit casing, said second conveying means having an inclined path relative to said gripping means to provide a cross-sweep motion between said slit casing and gripping means to thereby strip said casing from said sausage, means operatively associated with said second conveying means to separate said stripped casing and sausage, and driving means to move said second conveying means and said gripping means toward said means to separate, said means to separate comprising a pair of co-acting counter-rotating rollers between which the stripped casing is fed and separated from the sausage.

18. Apparatus for stripping the artificial casing from prepared sausage which comprises a main conveyor for the encased sausage, casing slitting means positioned relative to said conveyor to slit the artificial casing as it is conveyed past said slitting means, means operatively associated with said conveyor to move the same toward said slitting means, second conveying means operatively associated with said main conveyor for the slit casing and sausage, casing gripping means operatively associated with said second conveying means for frictionally engaging the slit casing, said second conveying means having an inclined path relative to said gripping means to provide a cross-sweep motion between said slit casing and gripping means to thereby strip said casing from said sausage, means operatively associated with said second conveying means to separate said stripped casing and sausage, and driving means to move said second conveying means and said gripping means toward said means to separate, said means to separate comprising a pair of co-acting counter-rotating rollers between which the stripped casing is fed and separated from the sausage, said rollers being mounted on a downwardly inclined axis toward the discharge end of the apparatus whereby the stripped sausage is discharged.

19. Apparatus for stripping the artificial casing from prepared sausage which comprises a main conveyor for the encased sausage, casing slitting means positioned relative to said conveyor to slit the artificial casing as it is conveyed past said slitting means, means operatively associated with said conveyor to move the same toward said slitting means, second conveying means operatively associated with said main conveyor for the slit casing and sausage, casing gripping means operatively associated with said second conveying means for frictionally engaging the slit casing, said second conveying means having an inclined path relative to said gripping means to provide a cross-sweep motion between said slit casing and gripping means to thereby strip said casing from said sausage, means operatively associated with said second conveying means to separate said stripped casing and sausage, and driving means to move said additional conveying means toward said means to separate.

JAMES WILLIAM BALL.

References Cited in the file of this patent

UNITED STATES PATENTS

| Number | Name | Date |
| --- | --- | --- |
| 2,171,611 | Tolman et al. | Sept. 5, 1939 |
| 2,340,755 | Jacobson | Feb. 1, 1944 |
| 2,369,360 | Martin | Feb. 13, 1945 |
| 2,434,316 | Golden et al. | Jan. 13, 1948 |
| 2,463,157 | Deitrickson | Mar. 1, 1949 |
| 2,493,707 | Weber | Jan. 3, 1950 |